A. C. WURTELE.
Gyroscopic Toys.
No. 139,988.    Patented June 17, 1873.
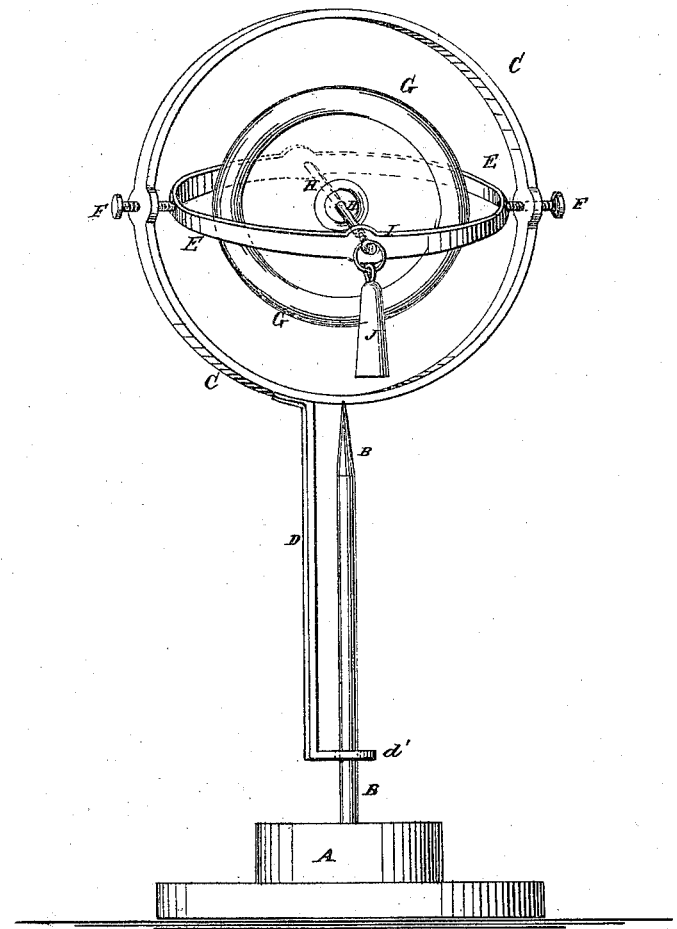
Witnesses:
A. W. Almqvist
C. Sedgwick
Inventor:
A. C. Wurtele
Per
Attorneys.

UNITED STATES PATENT OFFICE.

ARCHIBALD C. WÜRTELE, OF NEW YORK, N. Y.

IMPROVEMENT IN GYROSCOPIC TOYS.

Specification forming part of Letters Patent No. 139,988, dated June 17, 1873; application filed April 26, 1873.

*To all whom it may concern:*

Be it known that I, ARCHIBALD C. WÜRTELE, of New York city, in the county and State of New York, have invented a new and useful Improvement in Gyroscopic Toy, of which the following is a specification:

The figure is a perspective view of my improved toy.

My invention has for its object to furnish an improved toy, which shall be so constructed that, by giving a rapid motion to a wheel suspended in it, it may be made to revolve in various positions and directions.

The invention consists in an improved gyroscopic toy, formed by the combination with each other of the base, the pivot, the outer ring, the arm and ring, the inner ring and its screw-pivots, and the wheel and axle and its screw-pivots; and in the combination of the suspended weight with the toy, as hereinafter fully described.

A is the base, to which is attached a pivot, B, upon the upper end or point of which is pivoted a ring C. To the ring C at a little distance from its pivoting-point is rigidly attached an arm, D, which projects downward parallel with the pivot B. Upon the lower end of the arm D is formed a ring, $d'$, through which the pivot B passes. E is a ring, made smaller than the ring C, the opposite sides of which are pivoted to the opposite sides of the ring C and at right angles with the axis of said ring C, by two set-screws, F. G is a heavy wheel attached to an axle, H. The wheel and axle G H are pivoted to the opposite sides of the ring E, at right angles with the pivots of said ring by two screws, I, the points of which rest against the ends of the axle H. J is a weight, which, for giving some movements to the toy, is suspended from one of the screws I. Motion is given to the wheel G by means of a cord wound around its axle H and drawn off in the same manner that motion is given to a humming-top. The instrument is then placed upon its pivot or stand and the ring E is brought into a horizontal position, the wheel G revolving in a vertical plane. If, now, the ring C is turned upon its pivot, the wheel G will move to and revolve in a horizontal plane, its axle, H, being vertical. The particular end of the axle H that moves upward will depend upon the direction in which the ring E is turned upon its pivot; and its ends can be reversed at will by simply changing the direction in which the ring C is turned upon its axle. While the axle H is horizontal there is considerable resistance encounted in turning the ring C upon its pivot, but when the axle H becomes vertical the ring C will turn easily, the force of the resistance depending upon the velocity at which the wheel G may be revolving. The wheel G and inside ring E may be made to revolve together upon the screw-pivots F of the outer ring by turning the ring C alternately to the right and to the left, changing the motion as soon as the axle H becomes perpendicular. It will revolve in one or the other direction, according to the direction in which it is started. When the wheel G is revolving with its axle H horizontal, if the weight J be hung upon one of the screws I, the ring C will begin to revolve upon the pivot B to the right or left, according as the weight J is hung upon one or the other of the screws I, the ring C turning slower or faster according as the wheel G be revolving faster or slower. When the wheel G is revolving rapidly with its axle H in a horizontal position, and pointing in any direction, as, for instance, north and south, if the stand A B be raised and the person holding it turn around in either direction, the position of the wheel G will remain the same, its axle H always pointing north and south, or in the same direction as when raised.

Having thus described my invention, what I claim as new, and desire to secure by Letters Patent, is—

1. The improved gyroscopic toy formed by the combination with each other of the base A, pivot B, ring C, arm and ring D $d'$, inner ring E, screw-pivots F, wheel G, axle H, and screw-pivots I, substantially as herein shown and described.

2. The combination of the suspended weight J with the parts A, B, C, D, E, F, G, H, I, substantially as herein shown and described.

ARCHIBALD C. WÜRTELE.

Witnesses:
JAMES T. GRAHAM,
T. B. MOSHER.